US006363250B1

(12) United States Patent
Lindell

(10) Patent No.: US 6,363,250 B1
(45) Date of Patent: Mar. 26, 2002

(54) ARRANGEMENT AND A METHOD RELATING TO CELLULAR RADIO COMMUNICATION SYSTEMS

(75) Inventor: Bo Lindell, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/465,508

(22) Filed: Dec. 16, 1999

(30) Foreign Application Priority Data

Dec. 18, 1998 (SE) ................................................ 9804429

(51) Int. Cl.⁷ .............................. H04Q 7/20; H04Q 7/32
(52) U.S. Cl. ...................... 455/422; 455/456; 455/424; 455/423; 455/556; 455/557; 342/357.08; 342/357.07
(58) Field of Search .................................. 455/517, 422, 455/426, 456, 424, 425, 66, 556, 557, 550, 575, 423, 67.1, 351; 342/357.08, 357.07, 357.12

(56) References Cited

U.S. PATENT DOCUMENTS 5,666,111 A    9/1997   Servat et al. ................ 340/980
6,016,120 A *  1/2000   McNabb et al. ........ 342/357.08

FOREIGN PATENT DOCUMENTS

EP          0 448 018      9/1991
WO          WO 93/05474    3/1993

OTHER PUBLICATIONS

Erlandsson T., International-Type Search Report, Search Report No. SE98/01465, Aug. 6, 1999, pp. 1–6.

* cited by examiner

*Primary Examiner*—William Trost
*Assistant Examiner*—Keith Ferguson
(74) *Attorney, Agent, or Firm*—Jenkens & Gilchrist A Professional Corporation

(57) ABSTRACT

The invention provides a solution to the problem of providing an inexpensive and simple compass unit which, nevertheless, compensates automatically for different deviations in the Earth's magnetic field at different places in the world. Briefly, the solution involves an novel electronic compass unit, a method in the operation of the compass unit, and a cellular radio communication system. An electronic compass unit constructed in accordance with the invention and located within an area covered by the radio communication system receives information concerning the local magnetic deviation from the correct direction to the geographic North Pole from a data storage unit which is central to the system, through the medium of a connected radio unit. Information concerning the local magnetic deviation is sent from the central data storage unit to respective radio units from a radio base station situated close to said radio unit, via a downlink.

10 Claims, 3 Drawing Sheets

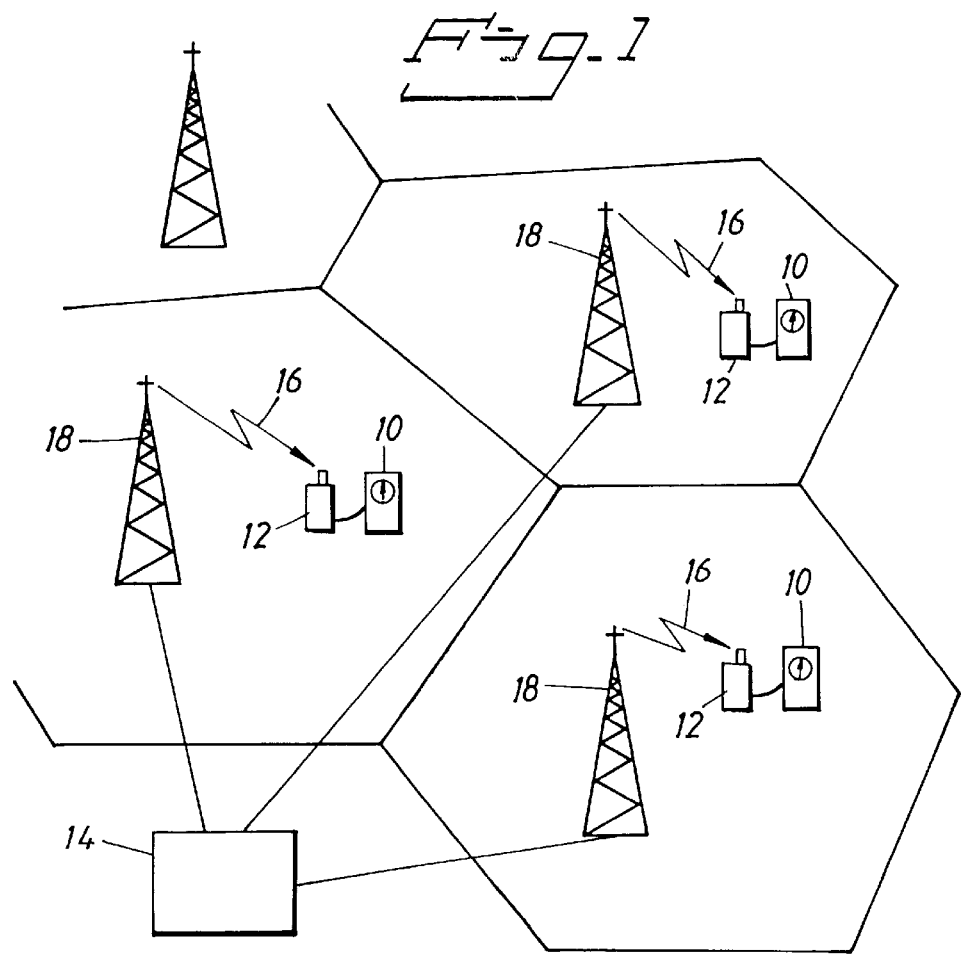
Fig. 1
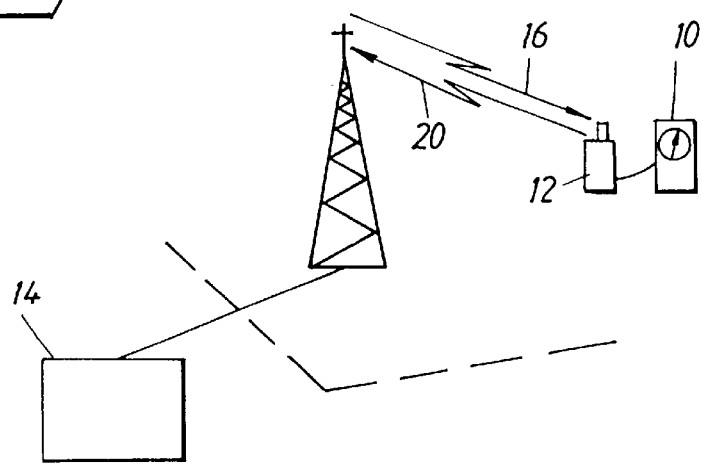

ARRANGEMENT AND A METHOD RELATING TO CELLULAR RADIO COMMUNICATION SYSTEMS

TECHNICAL FIELD

The present invention is concerned with a radio communication system and relates to an arrangement and to a correction method in connection with such communications systems.

BACKGROUND OF THE INVENTION

Electronic compasses are used as an alternative to the well known magnetic compass, in order to determine and show the direction NORTH. Electronic compasses are used more in electronic positioning and navigational systems.

The U.S. Pat. No. 5,353,241 teaches an electronic compass system that includes, among other things, a flux-gate sensor that has an associated flux-gate drive circuit for sensing the direction of the terrestrial magnetic field.

A flux-gate magnetic-flux sensor includes two sensor coils positioned perpendicularly in relation to one another. Magnetic fields induce voltage across the coils. The aptitude of the voltage will depend on how the compass, and therewith the coils, are orientated in relation to the direction of the Earth's magnetic field. This dependency is obtained, for instance, by virtue of the pair of mutually orthogonal sensor coils surrounding a ring-shaped core of magnetic material which is saturated and de-magnetized periodically. The sensor coils therewith generate periodically outward signals which represent the length of the component vectors on respective coordinate axes in a Cartesian coordinate reference system. The system coordinate axes are defined with respect to the compass and its angle of rotation—with regard to the direction of the magnetic North Pole. The result, in other words, the vector sum of the component vectors, therewith points to the magnetic North Pole, whereas the rotational angle of the coordinate system represents the angle through which the compass is rotated from the direction towards north, the vector of the Earth's magnetic field. Theoretically, the vector sum of the two outward signals of an electronic compass should follow a circle with its center in the origin of the reference system when the compass, and therewith the coordinate system, is rotated through 360°, i.e. a full revolution. The circle is deformed, however, by disturbance fields.

These magnetic disturbance fields can be compensated for by a compensation circuit and a microprocessor, as described in U.S. Pat. No. 5,353,241.

The solution taught by the U.S. Pat. No. 4,482,255 uses a Hall-element as a magnetic flux sensor. It is also known to use magneto resistive sensors as magnetic-flux sensors in electronic compasses; see U.S. Pat. Nos. 4,640,016 and 5,600,611 in this respect.

In order to use the electronic compass, it must be calibrated. U.S. Pat. No. 5,165,269 describes, among other things, an arrangement and a method for calibrating the compass so that it will give a true reading.

The aforesaid electronic compasses do not, however, take the local direction from true north into account. As is known, there are different, wide deviations from true north at different geographical places. In certain places, these deviations are so great as to necessitate compensation.

A direction determining device is known from document WO,A1,9305474. A user is able to determine different directions—the the direction to the starting point, to the target and to the North Pole with the aid of a direction indicator and different illuminated indicators. The device can be carried in the hand of a user and includes a flux-gate compass for determining bearings and a GPS-type radio navigational receiver (Global Positioning System that use geostationary satellites) for determining the longitude and latitude coordinates for each geographic position. A directional computer in the device fetches from the GPS-receiver latitudinal and longitudinal information relating to the current position of the user and his bearing relative to north from the flux-gate compass, while making correction for local deviations with the aid of a separate unit (213 in FIG. 2). This unit indicates the geographic North Pole.

A further device that includes both magnetic field sensors and GPS-receiver is described in document WO,A1, 9748025. This device functions to determine the geographic north direction from the measured magnetic north direction, by correcting the local magnetic deviation place in question—information that is stored in the device. One problem with this solution is that a large quantity of data is required to compensate for misreading of a compass unit if the unit is intended to be sold and used in different places in the world, which means that each individual compass unit must include at least one data store of large storage capacity.

Another problem is that it is difficult for an inexperienced user to use an electronic compass and GPS-system. The more complex the system the more training and regular use required for a user to become sufficiently clever to use the system without making mistakes. This can have serious consequences.

SUMMARY OF THE INVENTION

Each individual compass unit that includes a GPS-receiver must therefore include a data store of large storage capacity for storing misleading information in respect of each area or place in the world when such compass units are intended for sale and use anywhere on Earth. The costs of each compass unit increases as a result of this requirement of extra data capacity.

The invention provides a solution to the problem of providing an inexpensive and simple compass unit which has, nevertheless, automatic compensation for different deviations in the terrestrial magnetic field at different places in the world.

One object of the invention is to provide an inexpensive compass unit which, nevertheless, has automatic compensation for different deviations in the terrestrial magnetic field at different places in the world.

Another object of the present invention is to enable an inexperienced compass user to obtain a correct reading to the geographic North Pole in a simple manner.

In brief, the invention solves the aforesaid problems with a novel electronic compass unit, a novel method in respect of said compass unit, and a novel cellular radio communication system. An electronic compass unit constructed in accordance with the invention and located within the area covered by a radio communication system obtains, with the aid of a connected radio unit, information concerning the local magnetic deviation from a correct direction to the geographic North Pole from a central data storage unit in the system. Information concerning the local magnetic deviation is transferred from the central data storage unit to respective radio units via a downlink from a radio base station located close to the radio unit.

More specifically, the invention relates to a cellular radio communication system which includes radio base stations for radio communication with radio units over the air interface, said radio communication system being characterized in that it includes a data storage unit which is central to a plurality of radio base stations and from which information concerning the local magnetic deviation from the true direction of the geographic North Pole can be transferred to respective radio units from a base station located close to said radio unit, via a downlink.

The invention also relates to an electronic compass that includes an indicating unit which shows the direction towards the geographic North Pole, and an arithmetic unit or calculating unit for processing input data from a sensor which senses the Earth's magnetic field, wherein the compass is characterized in that a radio unit for cellular radio communication is connected to said calculating unit. The radio unit is designed to receive and forward information concerning the local magnetic deviation as input data to the calculating unit, which, in turn, is designed to deliver a corrected input data signal to the indicating unit for indicating the direction to the geographic North Pole.

The invention also relates to a method of compensating automatically for magnetic deviation in an electronic compass, wherein the method includes the step of determining the direction of the Earth's magnetic field on the basis of input data from said sensor. The inventive method is characterized by inputting data relating to the local magnetic deviation into the calculating unit via a radio unit in a cellular radio communication system, and by causing the calculating unit to calculate a compensated direction which is delivered to the indicating unit in further steps, to indicate the direction of the geographic North Pole.

One advantage is that large and expensive storage devices are not required for storing the misleading values corresponding to different Earth positions.

Another advantage is that the invention facilitates the use of this type of compass.

The invention will now be described in more detail with reference to preferred embodiments thereof and also with reference to the accompanying drawings.

BRIEF DESCRIPTION OF THE DRAWINGS

FIG. 1 is a simplified illustration of a cellular radio communication system.

FIG. 2 is a simplified illustration of a second embodiment of the invention in a radio communication system.

DESCRIPTION OF PREFERRED EMBODIMENTS

Figure 3:
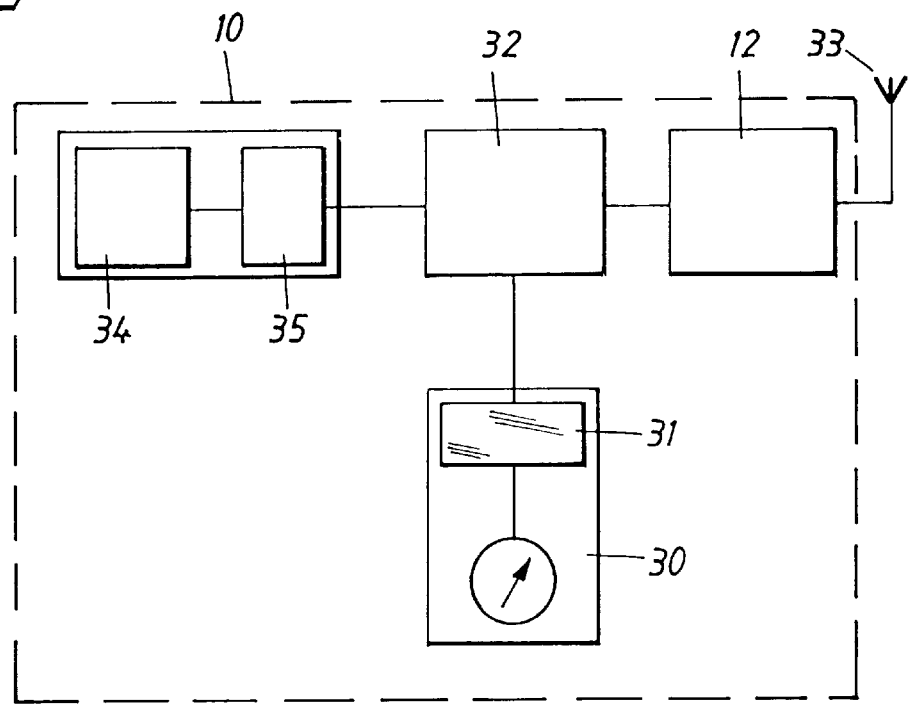
FIG. 3 is a block schematic illustrating an electronic compass unit.

FIG. 1 illustrates a cellular radio communication system that includes radio base stations 18 for radio communication with radio units 12 over an air interface. According to the inventive concept, an electronic compass 10 located within the area covered by the radio communication system obtains information relating to local magnetic deviation from the correct direction to the geographical North Pole from a central data storage unit 14, e.g. from a server data base, with the aid of a radio unit 12. Information relating to the local magnetic deviation is transferred from the central data storage unit 14 to respective radio units 12 through a base station 18 situated close to the radio unit, via a downlink.

This information can be transferred only downlink in several ways. Generally, a quantity of different type of information, such as user data and control signalling is transferred between a base station and a radio unit. In a TDMA-system for instance, reference is made to different logic channels, depending on the type of information transferred. The various logic channels are transmitted in a particular order on a physical channel, which is a time slot on a special carrier frequency TDMA (Time Divisional Multiple Access). The logic channels are divided into two categories: control channels and traffic channels.

In one preferred embodiment of the radio communication system, data information is transmitted via a control channel. This channel is either a Broadcast Control Channel (BCCH) or a Common Control Channel (CCCH) all of which activate radio units in the system to a listening mode. The radio unit receives continuously deviation information via the control channel, and forwards this information to an appropriate unit in the electronic compass unit for automatically correcting the compass declination. One advantage with this system is that the radio unit need only listen to the base station control channels.

FIG. 2 illustrates another embodiment of the system, in which information is transferred from the central data storage unit 14 via a traffic channel 16. Because the traffic channels are established between the radio unit and the base station only when user data shall be transmitted, a compass declination is not update continuously as in the earlier described embodiment. One advantage with the use of traffic channels, is that information of a type other than compass declination can be fetched from the central data storage unit. However, it is necessary to first establish an uplink to the base station and the central data storage unit. This requires the provision of more sophisticated equipment, in other words the provision of a complete mobile terminal for cellular radio communication.

Especially adapted equipment is required to enable the use of the inventive cellular radio communication system. FIG. 3 is a block schematic of an electronic compass unit 10 which includes a compass declination unit 30 that indicates the direction to the geographic North Pole, and which also includes a calculating unit 32 for processing input data from a sensor 34 that functions to sense the Earth's magnetic field-flux. The sensor 34 is connected to the calculating unit 32 via a module 35 which includes the necessary drive circuit for the sensor 34 and measuring signal converter, among other things. The radio 12 having an antenna 33 for cellular radio communication is connected to the calculating unit 32, wherewith the radio unit 12 is adapted to receive from a nearby radio station information relating to the local magnetic deviation and to forward this information as calculating unit input data. The unit 33 is, in turn, adapted to calculate a corrected input data signal and to send this signal to the indicating unit 30 for indicating the direction to the geographic North Pole. The indicating unit 30 includes a digital or an analogue display unit 31 with associated signal processing module.

Figure 4:
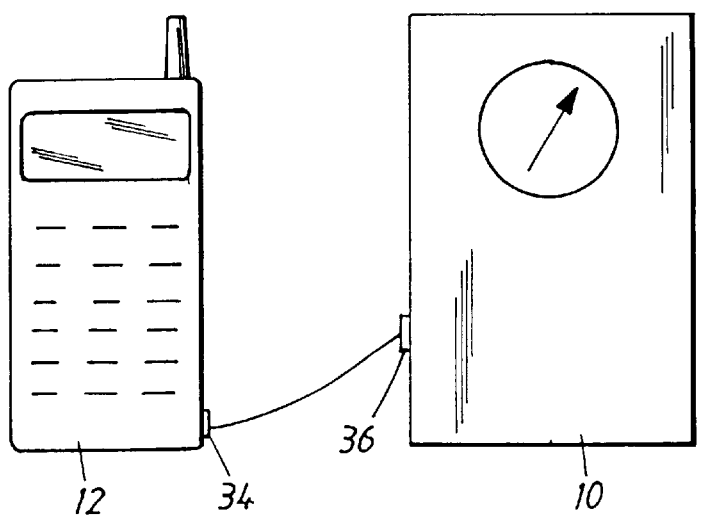
FIG. 4 is a block diagram illustrating a compass and a radio unit as separate units.

FIG. 4 illustrates a compass 10 and a radio unit 12, which are in the form of separate units and have respective data ports 34 and 36. The radio unit that includes the data port 38 is included in a terminal for mobile radio communication that can communicate with the compass 10 via its data port 36.

In one variant, the compass and the radio unit are interconnected via an electric conductor 40.

In another variant, the compass and the radio unit are in wireless communication, i.e. communicate optically, capacitively, inductively or by short propagation radio waves.

The data ports are then input/output units that are adapted according to use.

Figure 5:
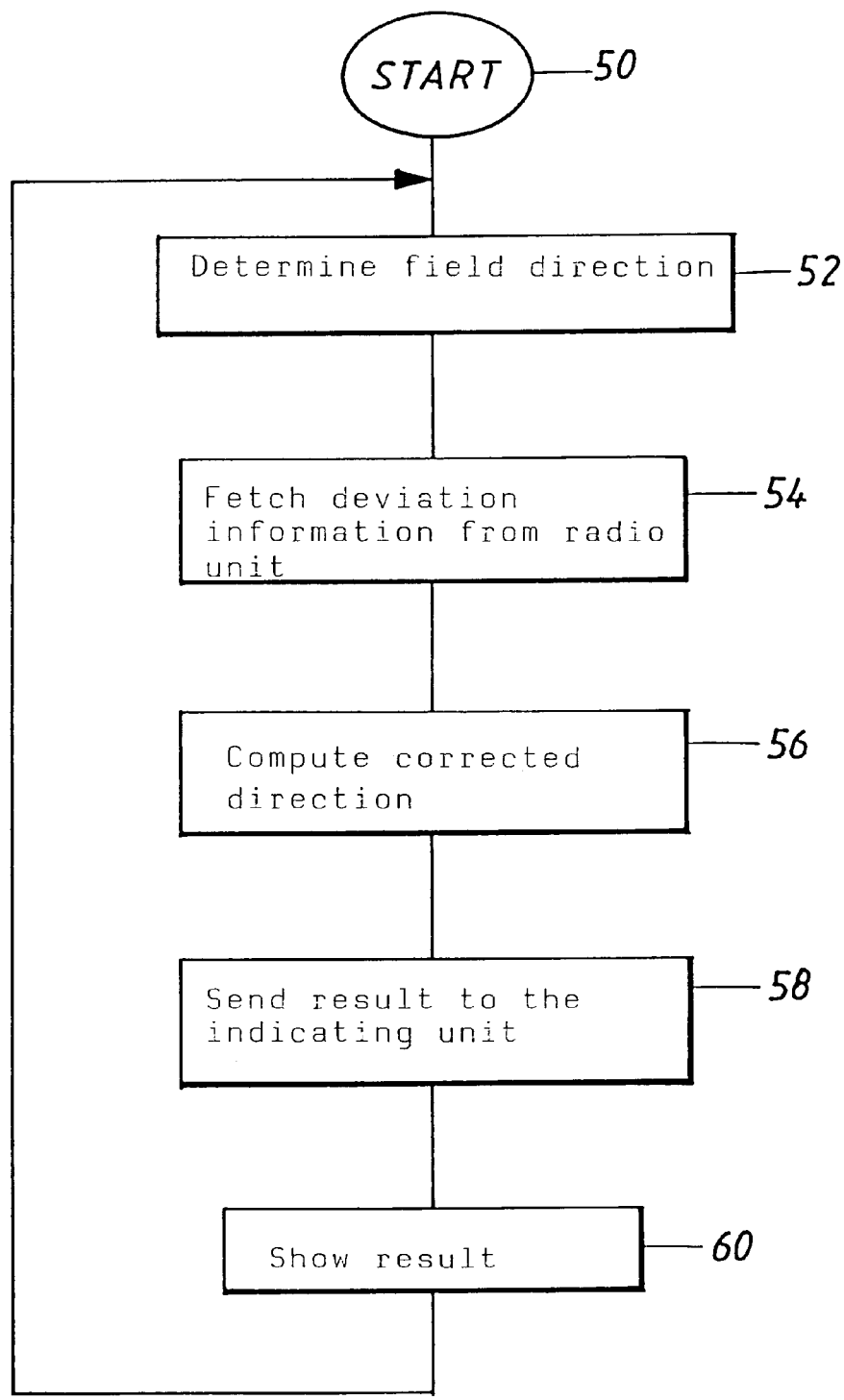
FIG. 5 is a flowchart illustrating the inventive method.

The invention also relates to another method of compensating for magnetic deviation in an electronic compass. FIG. 5 is a flow chart illustrating this method. The method includes from the start 50 a step 52 in which the direction of the Earth's magnetic field is determined on the basis of input data from said indicator. The novel method also includes a step 54 in which the calculating unit automatically fetches input data concerning the local magnetic deviation, via a radio unit in a cellular radio communication system. In a following step 56, a calculating unit calculates a corrected direction. The result of this calculation is delivered to an indicating unit as a corrected input data signal in a following step 58. Finally, in step 60, the result is presented on the indicating unit as an indication of the correct direction to the geographic North Pole. This procedure is repeated for each new calculation.

In an alternative method, the calculating unit fetches input data concerning the local magnetic deviation via a radio unit of a cellular radio communication system solely in the first iteration of the method, and stores this information in an addressable memory cell in a data storage unit associated with the calculating unit. In following iterations, the input data is collected from the memory cell and not from the radio unit. The first iteration is repeated, e.g., each time the radio unit is switched on after having been switched off.

Certain of the embodiments have been described above with reference to a TDMA-type radio communication system. It will be understood, however, that the invention is not limited solely to this type of system. The person skilled in this art will have no problem in utilizing the described invention in other types of cellular radio communication system, such as FDMA (Frequency Division Multiple Access), CDMA (Code Division Multiple Access), WCDMA (Wideband CDMA) and so on. Each adaptation to other cellular radio communication systems will nevertheless lie within the scope of the presented inventive concept.

It will also be understood that the invention is not restricted to the aforedescribed and illustrated exemplifying embodiments thereof, and that modifications can be made within the scope of the following claims.

What is claimed:

1. A cellular radio communication system which includes radio base stations for radio communication with radio units over an air interface, comprising:
   a data storage unit:
   wherein information concerning the local magnetic deviation is transferred to respective radio unit from a data storage unit which is central to a plurality of base stations via a downlink, from a base station located close to the radio unit.

2. A radio communication system according to claim 1, wherein information concerning said local magnetic deviation is transmitted on a radio channel for control information.

3. A radio communication system according to claim 1, wherein information concerning the local magnetic deviation is transmitted on a radio channel for user data.

4. An electronic compass unit, comprising:
   an indicating unit adapted to show the direction to the geographic North Pole;
   calculating unit for processing input data from a sensor which functions to sense the Earth's magnetic field; and
   a radio unit for cellular radio communication, the radio unit connected to the calculating unit, wherein the radio unit is adapted to receive information concerning the local magnetic deviation and to send said information as input data to said calculating unit, which, in turn, is adapted to send to the indicating unit a corrected input data signal for indicating the direction to the geographic North Pole.

5. An electronic compass unit according to claim 4, wherein the sensor, the calculating unit and the radio unit are integrated in a terminal for mobile radio communication.

6. An electronic compass unit according to claim 4, wherein the compass unit and the radio unit are separate units which each have a respective data port, wherewith the radio unit is included in a terminal for mobile radio communication and capable of communicating with the compass unit via said data ports.

7. An electronic compass unit according to claim 6, wherein the compass unit and the radio unit are interconnected via an electric conductor.

8. An electric compass unit according to claim 6, characterized in that the compass and the radio unit are in wireless communication via optical data ports.

9. A method of correcting an electronic compass unit for local magnetic deviations, said compass unit including an indicating unit which indicates the direction to the geographic North Pole, and a calculating unit for processing input data from a sensor which senses the Earth's magnetic flux, the method comprising:
   determining the direction of the Earth's magnetic field on the basis of input data from the sensor; and
   fetching input data concerning said local magnetic deviation from the calculating unit via a radio unit in a cellular radio communication system, wherein said calculating unit calculates a compensated direction which is sent to the indicating unit as a corrected input data signal, so as to indicate the direction to the geographic North Pole.

10. A method of correcting an electronic compass unit in respect of the local magnetic deviation in accordance with claim 9, wherein the calculating unit fetches input data concerning the local magnetic deviation via a radio unit of a cellular radio communication system and stores this information in an addressable memory cell in a data storage unit connected to the calculating unit, wherewith input data concerning the local magnetic deviation is fetched from said memory cell for following calculations.

* * * * *

UNITED STATES PATENT AND TRADEMARK OFFICE
CERTIFICATE OF CORRECTION

PATENT NO.    : 6,363,250 B1                                          Page 1 of 1
DATED         : March 26, 2002
INVENTOR(S)   : Bo Lindell It is certified that error appears in the above-identified patent and that said Letters Patent is hereby corrected as shown below:

Column 5,
Line 49, replace "unit" with -- units --

Column 6,
Line 7, prior to "calculating unit" insert -- a --
Line 12, after "magnetic deviation" insert -- from a radio base station --
Line 41, prior to "the calculating" insert -- a radio base station for --

Signed and Sealed this

Twenty-second Day of July, 2003

JAMES E. ROGAN
*Director of the United States Patent and Trademark Office*